United States Patent Office 3,452,027
Patented June 24, 1969

3,452,027
2-HYDROXYALKYLISOCARBOSTYRILS
Theodore S. Sulkowski, Narberth, and Myles A. Wille, Philadelphia, Pa., assignors to American Home Products Corporation, New York, N.Y., a corporation of Delaware
No Drawing. Continuation-in-part of application Ser. No. 502,352, Oct. 22, 1965, now Patent No. 3,336,306. This application July 3, 1967, Ser. No. 651,142
Int. Cl. C07d *33/12, 33/46, 33/50*
U.S. Cl. 260—289                    10 Claims

ABSTRACT OF THE DISCLOSURE

This invention concerns 2-hydroxyalkylisocarbostyrils which are useful as antidepressants and tranquilizers. Further, this invention is concerned with the process of preparing these 2-hydroxyalkylisocarbostyril compounds by the interaction of an α-benzoyl-2-toluic acid with an alkanolamine.

---

This is a continuation-in-part of U.S. patent application, Ser. No. 502,352, filed on Oct. 22, 1965, entitled "Oxazoloisoindolones and Related Compounds" which issued on Aug. 15, 1967 as United States Patent No. 3,336,306.

This invention relates to new and useful oxygen and nitrogen containing cyclic ketone compounds as well as to the novel method for their preparation. In particular, the present invention is concerned with 2-hydroxyalkylisocarbostyrils which are pharmacologically active as antidepressant and tranquilizing agents.

The novel compounds which are included within the scope of this invention are selected from the group represented by the formula:

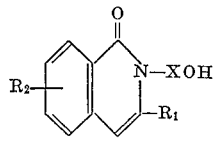

wherein $R_1$ is selected from the group consisting of thienyl, phenyl, halophenyl, aminophenyl, nitrophenyl, lower alkylphenyl and lower alkoxyphenyl; $R_2$ is selected from the group consisting of hydrogen, halo, nitro, amino, lower alkyl and lower alkoxy; and X is selected from the group consisting of —$CHR_3CHR_3$— and —$CHR_3CHR_3CHR_3$— wherein $R_3$ is selected from the group consisting of hydrogen, lower alkyl, phenyl, halophenyl, aminophenyl, nitrophenyl, lower alkylphenyl and lower alkoxy. Typical examples of the compounds of this invention are: 2-(3-hydroxypropyl) - 3 - phenylisocarbostyril; 2 - (2 - hydroxyethyl) - 3 - (2 - thienyl)isocarbostyril; 3 - (p-chlorophenyl) - 2 - (2 - hydroxy - 2 - phenylethyl)isocarbostyril and 2-(2-hydroxyethyl)-3-phenylisocarbostyril.

In accord with the present invention, these 2-hydroxyalkylisocarbostyril compounds have been found, in standard pharmacological tests, to posses unique pharmaceutical properties which make them useful synthetic therapeutic agents. More particularly, these compounds are useful as antidepressant and tranquilizing agents.

In accord with the process of the present invention the above-mentioned 2-hydroxyisocarbostyrils may be prepared by the reaction of an α-benzoyl-2-toluic acid of the formula:

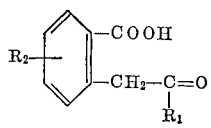

wherein $R_1$ and $R_2$ are as defined above; with an alkanolamine of the formula:

HO—X—$NH_2$ wherein X has the same meaning as previously set forth. The reaction is effected by heating a substantially equimolar mixture of the reactants in an inert organic solvent at a temperature from about 30° C. to about 100° C. for a period of from about one to about twenty-four hours. Preferably, this reaction is conducted in toluene at the reflux temperature of the reaction mixture for a period of sixteen to twenty hours. By inert inorganic solvent as employed herein is meant an organic solvent which dissolves the reactants but does not react with them under the above described reaction conditions. Although other solvents may be employed, as will suggest themselves to those skilled in the art, excellent results have been obtained when the aforesaid toluene is employed as the solvent. The majority of the reactants employed in the process of this invention are known compounds which are readily available from commercial sources, while the remainder can be prepared in accordance with standard organic procedures well known to those skilled in the art.

After the reaction is complete, the reaction mixture is cooled and washed with an aqueous alkaline solution, for example, sodium hydroxide, potassium hydroxide, sodium bicarbonate and sodium carbonate. Thereafter, the product is obtained by conventional methods such as concentration and crystallization. The product may be recrystallized from suitable alkanol solvents, such as ethanol.

In accord with the above described process, the general reactants listed in Table I react to produce the corresponding listed products, which are representative of the type of compounds within the scope of the present invention. It is intended that the word "substituted" as employed in Table I shall also include the corresponding unsubstituted hydrogen containing moiety. In this regard, the compounds of this invention were originally thought to be oxazoloisoquinolinones and oxazinoisoquinolinones. However, nuclear magnetic resonance (NMR) data has now established that these compounds should, in fact, be respectively designated as 2-(2-hydroxyethyl)isocarbostyrils and 2-(3-hydroxypropyl)isocarbostyrils.

TABLE I

| Reactants | Products |
|---|---|
| An α-benzoyl-2-toluic acid and a substituted aminoethanol. | A 2-(1,2-disubstituted-2-hydroxy-ethyl)-3-substituted phenylisocarbostyril. |
| An α-benzoyl-2-toluic acid and a substituted aminopropanol. | A 2-(1,2,3-trisubstituted-3-hydroxypropyl)-3-substituted phenylisocarbostyril. |

When the compounds of this invention are employed as tranquilizers and antidepressants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excepients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile suspension containing other solutes, for example, saline or glucose.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 200 mg. to about 1200 mg. per day, although as aforementioned variations will occur. However, a dosage level that is in the range of from about 300 mg. to about 600 mg. per day is most desirably employed in order to achieve effective results.

The following examples are given by way of illustration and are not to be construed as limitations of this invention, many variations of which are possible without departing from the scope and spirit thereof.

Example I

Eight grams of α-benzoyl-2-toluic acid, 12 ml. of 3-aminopropanol, and 100 ml. of toluene are refluxed 18 hours in a flask equipped with a water separator. The solution is cooled, washed with water and saturated sosodium carbonate solution. After drying over magnesium sulfate, the solution is evaporated to an oil which solidifies on standing. On recrystallization from aqueous ethanol, there is obtained 2-(3-hydroxypropyl)-3-phenylisocarbostyril, M.P. 103–5° C.

In a similar manner, 3-(p-ethoxyphenyl)-2-(3-hydroxypentyl) isocarbostyril and 2-[3-hydroxy-2-(p-methoxyphenyl)propyl]-3-phenylisocarbostyril are synthesized.

Example II

Eleven grams of α-(2-thenoyl)-2-toluic acid, 15 ml. of ethanolamine and 100 ml. of toluene are refluxed for 18 hours in a flask equipped with a water separator. The solution is cooled, washed with water and saturated sodium carbonate solution. After drying over magnesium sulfate, the solution is evaporated to an oil which solidifies on cooling. On recrystallization from aqueous alcohol there is obtained 2-(2-hydroxyethyl)-3-(2-thienyl)isocarbostyril.

Example III

Five grams of α-benzoyl-4-nitro-2-toluic acid, 7 grams of 2-aminobutanol-1 and 50 ml. of toluene are refluxed for 20 hours in a flask equipped with a water separator. The solution is then cooled and washed with water and a saturated sodium carbonate solution. After drying over magnesium sulfate, the solution is evaporated to dryness. In this manner, is obtained 2-(1-ethyl-2-hydroxyethyl)-6-nitro-3-phenylisocarbostyril.

In a similar manner, when α-benzoyl-4-methoxy-2-toluic acid is reacted with 3-aminobutanol-2 there is obtained 2 - (2-hydroxy-1-methylpropyl)-6-methoxy-3-phenylisocarbostyril and when α-(p-methoxybenzoyl)-2-toluic acid is reacted with 2-aminopropanol-1, there is produced 2 - (3 - hydroxy - isopropyl) - 3 - (p-methoxyphenyl) isocarbostyril.

Example IV

When the procedure described in the foregoing example is followed reacting an appropriate α-benzoyl-2-toluic acid with an alkanolamine, the hereinafter listed products are obtained:

3-(m-bromophenyl)-2-(1-hydroxymethylpentyl)isocarbostyril, 7-amino-2-[2-(p-chlorophenyl)-2-hydroxyethyl]-3-phenylisocarbostyril, 2-[2-hydroxy-2-(p-tolyl)ethyl]-3-(p-iodophenyl)isocarbostyril, 2-[1-(p-aminophenyl)-2-hydroxyethyl]-3-phenylisocarbostyril, 8-chloro-2-[2-hydroxy-1-(p-iodophenyl)ethyl]-3-phenylisocarbostyril, 6-bromo-2-(2hydroxyethyl)-3-(p-nitrophenyl)isocarbostyril, 2-(2-hydroxyethyl)-3-(m-tolyl)isocarbostyril, 2-[2-hydroxy-2-(p-pentoxyphenyl)ethyl]-3-phenylisocarbostyril, 2-[2-(p-ethoxyphenyl)-2-hydroxyethyl]-3-(p-pentylphenyl)isocarbostyril, 2-[2-hydroxy-1-(m-ethylphenyl)ethyl]-7-iodo-3-phenylisocarbostyril, and 6,7-diethyl-2-[1-(p-heptylphenyl)-2-hydroxyethyl]isocarbostyril.

Example V

Twenty-seven grams of α-(3-amino-4-chlorobenzoyl)-2-toluic acid, 20 ml. of ethanolamine and 200 ml. of toluene are refluxed 16 hours in a flask equipped with a water separator. The solution is cooled, washed with water and a saturated sodium carbonate solution. After drying over magnesium sulfate, the solution is evaporated to a solid residue. On recrystallization from ethanol, there is obtained 3 - (3-amino-4-chlorophenyl)-2-(2-hydroxyethyl)isocarbostyril.

In a similar manner, there is produced 3-(p-chlorophenyl)-2-(2-hydroxy-2-phenylethyl)isocarbostyril.

Example VI

Twenty-two grams of α-benzoyl-2-toluic acid, 20 ml. of 2-aminoethanol, and 75 ml. of toluene are refluxed 18 hours in a flask equipped with a water separator. The solution is cooled, washed with water and with saturated sodium carbonate solution. After drying over magnesium sulfate, the solution is evaporated to an oil which solidifies on cooling. On recrystallization from aqueous ethanol, there is obtained 2-(2-hydroxyethyl)-3-phenylisocarbostyril.

Example VII

When the procedure of Example VI is repeated with the hereinafter listed starting compounds the following products are obtained:

| Starting compounds | Products |
|---|---|
| α-Benzoyl-4,5-dichloro-2-toluic acid and 3-aminobutanol-1. | 6,7-dichloro-2-(3-hydroxy-1-methylpropyl)-3-phenylisocarbostyril. |
| α-(2-thenoyl)-2-toluic acid and 4-aminobutanol-2. | 2-(3-hydroxybutyl)-3-(2-thienyl) isocarbostyril. |
| α-(p-Ethylbenzoyl)-4-bromo-2-toluic acid and 6-aminohexanol-4. | 6-bromo-3-(p-ethylphenyl)-2-(3-hydroxyhexyl)isocarbostyril. |

Example VIII

Twenty-six grams of α-(p-chlorobenzoyl)-2-toluic acid, 20 ml. of 3-aminopropanol and 75 ml. of toluene are refluxed for 20 hours in a flask equipped with a water separator. The solution is then cooled and washed with water and a saturated sodium carbonate solution. After drying over magnesium sulfate, the solution is evaporated to dryness and the residue is recrystallized from aqueous ethanol. In this manner, there is obtained 3-(p-chlorophenyl)-2-(3-hydroxypropyl)isocarbostyril.

Using the procedure described above, the following compounds are prepared:

2-[2-(p-bromophenyl)-3-hydroxypropyl]-7-ethoxy-3-phenylisocarbostyril, and 6-hexyl-2-(3-hydroxypropyl)isocarbostyril.

Example IX

Twenty-seven grams of α-(3-amino-4-chlorobenzoyl)-2-toluic acid, 20 ml. of 3-aminopropanol and 75 ml. of toluene are refluxed for 24 hours. Thereafter, the solution is cooled, washed with water and a dilute sodium hydroxide solution. After drying over magnesium sulfate, the solution is evaporated to dryness and the residue is recrystallized from aqueous propanol. In this manner, was obtained 3 - (3 - amino - 4 - chlorophenyl) - 2 - (3 - hydroxypropyl) isocarbostyril.

In a similar manner, 7-butoxy-2-(3-hydroxypropyl)-3-phenylisocarbostyril is produced.

What is claimed is:

1. A compound selected from the group consisting of those having the formula:

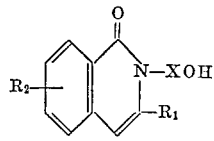

wherein $R_1$ is selected from the group consisting of thienyl, phenyl, halophenyl, aminophenyl, nitrophenyl, lower alkylphenyl and lower alkoxyphenyl; $R_2$ is selected from the group consisting of hydrogen, halo, nitro, amino, lower alkyl and lower alkoxy; and X is selected from the group consisting of —$CHR_3CHR_3$— and

—$CHR_3CHR_3CHR_3$— wherein $R_3$ is selected from the group consisting of hydrogen, lower alkyl, phenyl, halophenyl, aminophenyl, nitrophenyl, lower alkylphenyl and lower alkoxy.

2. 2-(3-hydroxypropyl)-3-phenylisocarbostyril.
3. 2-(2-hydroxyethyl)-3-(2-thienyl)-isocarbostyril.
4. 2-(1-ethyl-2-hydroxyethyl)-6-nitro-3-phenyl-isocarbostyril.
5. 3-(3-amino-4-chlorophenyl)-2-(2-hydroxyethyl)-isocarbostyril.
6. 3-(p-chlorophenyl)-2-(2-hydroxy-2-phenylethyl)-isocarbostyril.
7. 2-(2-hydroxyethyl)-3-phenylisocarbostyril.
8. A process for the production of compounds having the formula:

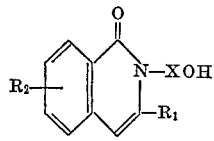

wherein $R_1$ is selected from the group consisting of thienyl, phenyl, halophenyl, aminophenyl, nitrophenyl, lower alkylphenyl and lower alkoxyphenyl; $R_2$ is selected from the group consisting of hydrogen, halo, nitro, amino, lower alkyl and lower alkoxy; and X is selected from the group consisting of —$CHR_3CHR_3$— and

—$CHR_3CHR_3CHR_3$— wherein $R_3$ is selected from the group consisting of hydrogen, lower alkyl, phenyl, halophenyl, aminophenyl, nitrophenyl, lower alkylphenyl and lower alkoxy, which comprises contacting a compound selected from the group consisting of the formula:

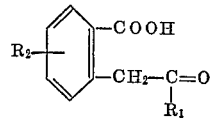

wherein $R_1$ and $R_2$ are defined as above, with a compound of the formula:

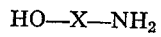

wherein X is defined as above; in a reaction-inert organic solvent at a temperature that is in the range from about 30° C. to about 100° C. for a period of from about one to about twenty-four hours.

9. A process as claimed in claim 8 wherein the reaction-inert organic solvent is toluene.

10. A process as claimed in claim 9 wherein the reaction is conducted at the reflux temperature of the reaction mixture.

References Cited

UNITED STATES PATENTS 3,336,306  8/1967  Sulkowski _____ 260—244

OTHER REFERENCES

Schnieder et al.: Chem. Abstr., vol. 54, col. 22650 (Abstracting Chem. Ber., vol. 93, pp. 1579–84) (1960).

ALEX MAZEL, *Primary Examiner.*

D. A. DAUS, *Assistant Examiner.*

U.S. Cl. X.R.

260—288, 570.6, 521, 583; 424—258